Nov. 23, 1943.                R. H. ZINKIL                2,334,855
           METHOD OF MAKING APERTURES IN PLASTIC EARTHENWARE
                       Filed Nov. 8, 1940
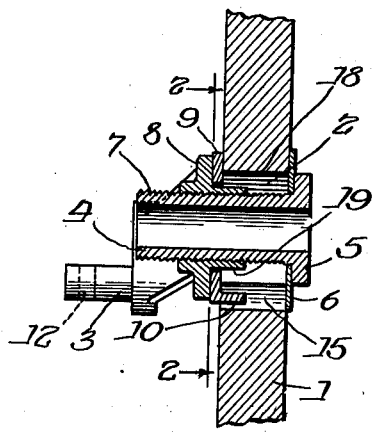
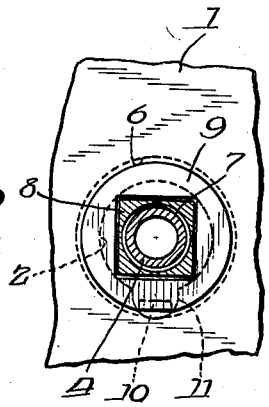
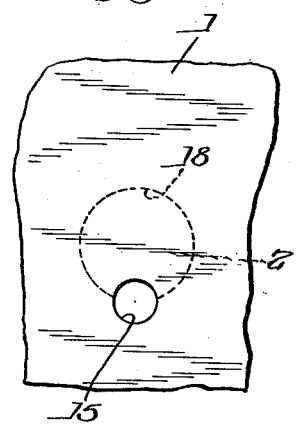
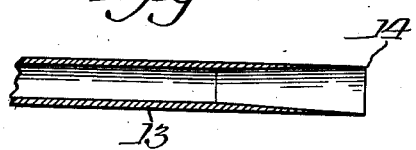
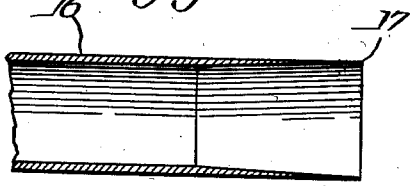
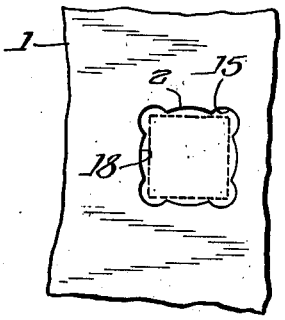
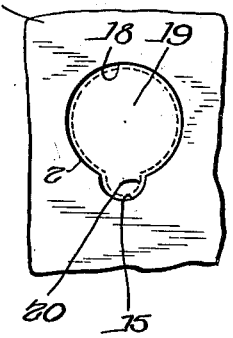
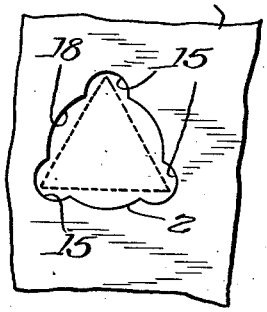
Inventor:
Roy H. Zinkil
By: Joseph O. Lange Atty.

Patented Nov. 23, 1943

2,334,855

UNITED STATES PATENT OFFICE 2,334,855

METHOD OF MAKING APERTURES IN PLASTIC EARTHENWARE

Roy H. Zinkil, Oak Park, Ill., assignor to Crane Co., Chicago, Ill., a corporation of Illinois Application November 8, 1940, Serial No. 364,888

5 Claims. (Cl. 25—156)

This invention relates to a method of making apertures in plastic earthenware. More particularly, this invention relates to a special form of aperture preferably produced by a series of rotative cuttings or punchings to produce a novel shape as hereinafter described, or the specially shaped aperture may be provided integrally with the ware as by casting (coring) of the opening in the initial formation of the ware.

To gain a greater appreciation of my inventive contribution, it should be realized at the outset, that it has long been a problem in the course of providing openings in vitreous ware and the like, as for example in closet tanks, lavatories and the like in which levers or faucets or other fixtures are mounted, to overcome the usual great hazard of cracking the ware when subjecting the latter even to a slight transverse strain. Heretofore the practical elimination of sharp inside corners has been impossible when used either with conventional square rods or even with plain bearings projecting therethrough, or in any other manner supporting a journaled lever within which bearing a stop limiting rotatability must be effected. Then, too, breakage of the ware has frequently occurred, due to the existence of inherent and invisible strains in localized relation to the aperture.

It should be understood that in addition to providing a bearing for a rotatable lever usually of varied polygonal form it is essential to prevent or at least minimize the hazard of objectionable chipping or cracking of the ware adjacent thereto and to avoid fatigue stresses and the like. Thus while square holes or other polygonally formed holes have been used in the past these latter provisions have been objectionable because of being responsible for the localized cracking of the ware. The explanation of such resultant cracking is advanced that apparently such sharp corners affect china or similar vitreousware in a manner analogous to the usual nicking of any hard material before attempting to break it. It is well known in the latter connection, for example, that if it is desired to break glass at a certain definite location the preliminary nicking at such point will be sufficient when accompanied by a sharp blow or undue strain to sever the glass precisely at the location designated. So it is with earthenware or other inherently brittle or extremely hard material. For example, on closet tanks in which square holes have been heretofore employed for the journaling of an operating lever for the flush valve, it has been found that after a period of time cracks have been formed through one or more corners of the square opening or other polygonal opening and thus while the path of breakage may not have been immediately discernible, nevertheless in time a gradual severance resulted leading to a sudden rupture of the ware with expensive results.

No one prior to my invention has apparently realized that a solution resided in making the bearing aperture of a special form devoid of sharp inside corners.

Thus for my method of overcoming the hazardous condition referred to I have devised the making of a novel type of aperture in which there are no sharp corners, in which the aperture is preferably formed by two or more circular openings combined in a manner as hereinafter explained in greater detail and which is particularly suited to an adaptation in which during the course of actual formation of the aperture the absolute avoidance of cracks or breakage due to cracks must be avoided. My method is applicable to any material in which penetration thereof may be effected by the rotation of a tool with a substantially circular or partially circular cutting edge. Therefore my reference to earthenware, vitreous ware and the like herein is merely incidental to illustrating an application of my invention.

Likewise, the aperture formed by my method is of such shape as to prevent the lever bearing member from rotating during its normal positioning but it is of such general configuration that round tools or those making circular cuts may be used for making the aperture. The latter feature embodies a very important advantage gained by the employment of my method to the extent that a slicing or rotatable cut can be used for making the opening as distinguished from what is termed a drifting cut, such as is necessary when the conventional square punch is forcibly pushed through the material. To those who are skilled in the art it will be quite obvious that a drifting cut often produces harmful distortion and tearing of the material or at least sets up internal fatigue stresses within, which eventually lead to the breakage complained of, notwithstanding that such stresses are not of course visible to the naked eye.

The use of my method allows for the formation of an aperture of such shape and size as to readily permit the use of the conventional type of actuating lever with a square hub or other polygonal form, and while certain preferred shapes of apertures made by the use of a combination of circles of unlike diameter are illustrated, it should be apparent that many other types of apertures may be made to serve as supporting means for bearings in tanks or the like for levers by various combinations of cutting tools in addition to those shown in the accompanying drawing, in which Fig. 1 shows the operating lever assembled with a fragmentary section of a tank employing one form of my invention.

Fig. 2 is a section taken on the line 2—2 of Fig. 1.

Fig. 3 shows one of the preliminary steps taken in the method of formation of a preferred simple aperture exemplifying my invention.

Fig. 3a shows the completed steps effecting the combined aperture in its final form.

Fig. 4 shows one form of cutter tool which may be used for the smaller of the two circular apertures required.

Fig. 5 shows another form of cutter tool which may be used for the larger of the two circular apertures.

Fig. 6 shows a modified form of combined aperture in which four of the smaller circular openings are used in combination with the larger circular opening.

Fig. 7 shows a modified form of aperture produced by using three smaller circular openings in combination with the larger circular opening.

Similar reference characters refer to similar parts in the various views of the drawing.

Merely for the purpose of showing a common type of installation, reference is made to Fig. 1 in which the closet tank or similar device in fragmentary section and preferably made of vitreous ware or similar material is generally designated as 1 having the aperture 2 through which the inwardly extending supporting bracket, generally designated as 3, is journally supported. In order to maintain the latter member in axially fixed position, the journaling element 4 is provided at one end with a flanged or enlarged portion 5 bearing against an outer washer 6, the journaling element 4 preferably having the running threads 7. A locknut 8 bearing against the inner washer 9 engaging the threads 7 holds the assembly in fixed position. It will be noted that in the particular embodiment illustrated the inner washer 9 is provided with a flange extension or tongue 10 which, as are clearly shown in Fig. 2, engages the slot portion 11 of the aperture 2 to lock the entire bearing assembly against relative rotation. The supporting bracket 3 is preferably provided with the transverse bearing 12 serving as a guide for the usual ball valve extension rod (not shown) during its reciprocating movement vertically upon the actuation of the lever for supplying water to a closet bowl from the tank proper. Obviously it is important that this supporting bracket not only remain in a predetermined position as established by the manufacturer with respect to the aperture 12 to insure the proper lift of the ball valve without interference, but that such setting retain its original position throughout the life of the installation. If, however, during the normal flushing operation such force should be exerted rotatably upon the handle (not shown) in an effort to actuate the lever and cause it to disturb rotatably the position of the journaling element 4 even slightly within its aperture, damage to the ware due to cracking generally resulted. In contrast, by eliminating the inner sharp corners of a polygonally formed aperture, the breakage or cracking traceable to this cause has been avoided.

Thus I provide in a more simple, quick method an aperture easily produced by a slicing action of the cutter tools 13 and 16 and clearly avoiding the injurious stresses, cracking and ultimate breakage within the material itself.

My unique method of accomplishing this result will perhaps be more vividly demonstrated and appreciated by referring to Fig. 3. Let it be assumed that the location of the supporting bracket 4 for the lever has been determined, which in this case is usually in the upper left hand corner of a closet tank. Upon determining the size of the supporting bracket, a cutter tool for the smaller circle is selected using preferably the type of cutter shown as 13 in Fig. 4 formed easily, but not necessarily, of relatively thin tubing in which the end portion 14 is ground down to a sharp edge, or which if the tubing is sufficiently thin it need not necessary require any grinding at all. This is obviously a matter of choice, depending upon the nature of the installation and the material used. Nor need the cutting edge extend completely around the tool periphery, since a tool with a rotatable traveling cutting edge would also be satisfactory. The cutter tool 13 is manipulated and while the ware is still in a relatively soft or plastic state the sharpened end of the tool is properly positioned against the plain surface of the ware. It will be apparent that by rotating the tool and then pressing it forward the desired circular opening is cut through the wall of the ware, whereby a clean, strain-free slicing cut is produced, totally unlike that produced by the usual punching. Thus the initial circular hole 15 is formed and, as indicated in dotted lines in Fig. 3, a larger circular cutter tool is next selected, depending upon the space required to accommodate the supporting bracket journaling member 4. The cutter of the larger diameter, generally designated 16 in Fig. 5 and having a cutting edge 17, is applied to the ware in the same manner as previously described in connection with the use of the smaller cutter tool 13, positioning such tool as desired so as to produce the opening 18, as indicated by the dotted lines in Fig. 3. Thus the aperture of the general configuration of a keyhole and designated generally as 19 will be produced, as more clearly shown in Fig. 3a.

In connection with the above description in which it referred to the journaling bracket 4, mention has been made to the use of a tongue portion 10 formed at right angles to fit within the slotted portion 15. However, it will be apparent that this specific structure is not necessary. If the journalling member 4, for example, were modified as generally designated as 19 in Fig. 3a and provided with an integral lug extension, as indicated by the dotted lines 20, the use of the tongued washer 9 may thereby be dispensed with. Under such circumstances the supporting bracket 4 being provided with lugs thus engages the slotted portion 15 in the same manner as previously described in connection with the tongue portion 10 and having the same purpose, that is, to prevent rotation and to assist in the more accurate positioning of the bracket extension 3.

As to other modified forms of apertures which might easily be used instead of making a single small aperture 15 in connection with the larger one 18, as shown in Figs. 1 to 3 inclusive, two, three, four or any other number of apertured portions 15 may be combined with the larger opening 18, as more clearly shown in Figs. 6 and 7. Thus, for example, as in Fig. 6, a supporting bracket 4 with a square cross-section, indicated in dotted lines, may be used. In this form of aperture the corners of the square will fit within the open portions of the smaller apertures 15 to prevent rotation of the square portion. Or, as shown as an added or alternate form of aperture in Fig. 7, instead of a square cross-section, one of generally triangular configuration may be used. In this form of aperture the corners of the triangle engage the open portions of the respective smaller apertures or formed slots 15 to likewise prevent rotation of the supporting bracket 4 for the reasons previously mentioned in referring to the other constructions. It should therefore be apparent that the method of making these apertures is applicable to a wide variety in which numerous cross-sectional forms of either irregular shape or polygonal form may be used.

In recapitulation, as shown in Fig. 3, while a single small aperture may be combined with a larger one to produce the keyhole form of completed aperture, a number of smaller apertures 15 may be provided in combination with a single large circular aperture 18 to accommodate a wide variety of cross-sectional shapes and forms of supporting brackets to be mounted within the finished aperture and held against rotation by reason of the engagement of the bracket journal bearing with any one of the slotted or smaller apertured portions of the completed opening.

I have found after repeated tests, inspections and after long experience in the field, that my particular method of providing these apertures definitely overcomes the previous objections of cracking, splitting, fatigue failure or other forms of breakage traceable either or both to the manner of making or to the type of aperture employed in the relatively fragile ware of the kind described.

During the course of this specification reference has been made to earthenware, vitreous ware, china and the like but it should be apparent that it is also applicable to any other form of material affected similarly by the use of improper apertures or method of making apertures. Therefore, it should be understood that the claims as appended hereto should be interpreted in the light of the prior art with a liberal range of equivalents as determined by the state of the prior art.

I claim:

1. A method of making apertures of the character described, which comprises applying a tool having a substantially circular cutting edge to the material in which the aperture is to be made, rotating and simultaneously pressing the tool forward to complete a substantially circular aperture through the material, selecting a second tool having a cutting edge of substantially circular form, locating the latter tool with respect to the first-named aperture so that the periphery of the cutting edge of the latter tool will pass substantially through a portion only of the first-named aperture produced by the cutting edge of the first-named tool, rotating said second tool and simultaneously pressing the same forward so as to produce a completed aperture of substantially circular form and in which the first-named aperture provides a slotted portion beyond the periphery of the said second-named aperture.

2. A method of making apertures in earthenware and similar material penetrable by a rotatable cutting edge, which comprises applying a single small substantially circular cutting tool to the material in which the aperture is to be made, rotating and pressing forward the cutting edge of the tool to complete a substantially circular aperture through the material, positioning a relatively larger tool having a cutting edge of substantially circular form transversely upon the material and with relation to the first-named aperture so that the periphery of the cutting edge of the latter tool passes through a substantial portion of the first-named aperture produced by the cutting edge of the smaller tool, rotating said larger tool and pressing the same forward so as to produce a completed aperture of substantially keyhole form.

3. A method of producing apertures in material penetrable by a rotative cutting edge, comprising the application of a substantially circular cutting tool to the material in which the aperture is to be made, rotating and pressing forward the cutting edge of the latter mentioned tool to complete a plurality of circular apertures in predetermined relation to each other, selecting a relatively larger tool of substantially circular form, locating the latter tool with relation to the first-named apertures so that the peripheral cutting edge of the latter tool passes simultaneously through a substantial portion of each of the apertures produced by the smaller tool, rotating the said larger tool and pressing the same forward to produce an ultimate combined aperture in which the first-named apertures define a portion of the outer peripheral limits of the said combined aperture.

4. A method of making apertures in vitreous-ware or like material which comprises applying a tool to the material in which the aperture is to be made, rotating and pressing forward the tool to produce at least a single circular aperture, applying a tool to the material, rotating and pressing forward the latter tool to produce a substantially second circular aperture with relation to the first-named aperture so that the periphery of the second aperture produced intercepts a substantial portion of the first aperture produced.

5. A method of making an aperture, which comprises applying a small rotating tubular tool with a peripheral cutting edge, pressing the tool forward upon the material in which the aperture is to be made to complete a substantially circular aperture, applying a relatively larger rotating tubular tool with a peripheral cutting edge to the first-named aperture so that the cutting edge of the latter mentioned tool intercepts a substantial peripheral portion of the aperture produced by the smaller tool, pressing the latter mentioned tool forward to complete the aperture.

ROY H. ZINKIL.